United States Patent
Gaete Jamett et al.

(10) Patent No.: US 8,811,826 B2
(45) Date of Patent: Aug. 19, 2014

(54) DATA TRANSMISSION WITH ROOM ILLUMINATIONS HAVING LIGHT EMITTING DIODES

(75) Inventors: Oscar Cristobal Gaete Jamett, München (DE); Sebastian Randel, München (DE); Harald Rohde, München (DE)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 12/677,538

(22) PCT Filed: Sep. 2, 2008

(86) PCT No.: PCT/EP2008/061560
§ 371 (c)(1),
(2), (4) Date: May 21, 2010

(87) PCT Pub. No.: WO2009/033984
PCT Pub. Date: Mar. 19, 2009

(65) Prior Publication Data
US 2010/0254714 A1    Oct. 7, 2010

(30) Foreign Application Priority Data

Sep. 11, 2007  (DE) .......................... 10 2007 043 255

(51) Int. Cl.
*H04B 10/04*    (2006.01)
(52) U.S. Cl.
USPC ........... 398/186; 398/189; 398/130; 398/172; 398/183

(58) Field of Classification Search
USPC ................. 398/172, 183, 186, 140, 189, 130; 362/227, 249.01, 249.02, 249.03
See application file for complete search history.

(56) References Cited

U.S. PATENT DOCUMENTS

| | | | |
|---|---|---|---|
| 4,211,929 A | 7/1980 | Tamburelli | 250/55 |
| 6,292,595 B1* | 9/2001 | Petteruti et al. | 382/313 |
| 6,542,270 B2* | 4/2003 | Perkins et al. | 398/140 |
| 6,750,790 B2* | 6/2004 | Ohki | 341/50 |
| 7,496,297 B2* | 2/2009 | Sun et al. | 398/182 |
| 7,560,677 B2* | 7/2009 | Lyons et al. | 250/205 |
| 7,583,901 B2* | 9/2009 | Nakagawa et al. | 398/183 |
| 7,929,867 B2 | 4/2011 | Nakagawa | 398/172 |
| 7,949,259 B2 | 5/2011 | Suzuki | 398/172 |

(Continued)

FOREIGN PATENT DOCUMENTS

| | | | |
|---|---|---|---|
| EP | 1564914 | 8/2005 | ............. H04B 10/10 |
| JP | 54048102 A | 4/1979 | ............... H04B 9/00 |

(Continued)

OTHER PUBLICATIONS

International Search Report and Written Opinion for Application No. PCT/EP2008/061560 (12 pages), Jan. 22, 2009.

*Primary Examiner* — Daniel Washburn
*Assistant Examiner* — Hibret Woldekidan
(74) *Attorney, Agent, or Firm* — King & Spalding L.L.P.

(57) ABSTRACT

Lamps having light emitting diodes configured for data transmission require the high-frequency circuit of higher power. In order to simplify the required electronics, the light emitting diodes are divided into groups and the groups are modulated differently. Due to the multilevel modulation, the symbol rate can be reduced with the data rate remaining the same, thus reducing the switching rate and the circuitry complexity.

22 Claims, 1 Drawing Sheet

(56) References Cited

U.S. PATENT DOCUMENTS

| | | | |
|---|---|---|---|
| 7,983,568 B2* | 7/2011 | Won et al. | 398/172 |
| 8,107,825 B2* | 1/2012 | Rajagopal et al. | 398/172 |
| 8,208,818 B2* | 6/2012 | Sasai | 398/185 |
| 8,233,806 B2* | 7/2012 | Kitaji | 398/172 |
| 8,253,353 B2* | 8/2012 | Baggen et al. | 315/308 |
| 8,254,791 B2* | 8/2012 | Irie | 398/183 |
| 8,594,510 B2* | 11/2013 | Schenk et al. | 398/172 |
| 8,630,549 B2* | 1/2014 | Kim et al. | 398/172 |
| 2002/0167701 A1 | 11/2002 | Hirata | 359/172 |
| 2004/0101312 A1 | 5/2004 | Cabrera | 398/172 |
| 2004/0207821 A1* | 10/2004 | Roddy et al. | 353/94 |
| 2004/0247323 A1 | 12/2004 | Morioka et al. | 398/140 |
| 2005/0002673 A1* | 1/2005 | Okano et al. | 398/130 |
| 2006/0056855 A1* | 3/2006 | Nakagawa et al. | 398/183 |
| 2006/0239689 A1* | 10/2006 | Ashdown | 398/130 |
| 2007/0058987 A1 | 3/2007 | Suzuki | 398/183 |
| 2008/0063410 A1 | 3/2008 | Irie | 398/182 |
| 2008/0079705 A1* | 4/2008 | Yang et al. | 345/207 |
| 2008/0122762 A1* | 5/2008 | Haung et al. | 345/82 |
| 2008/0252664 A1* | 10/2008 | Huang et al. | 345/690 |
| 2009/0269074 A1* | 10/2009 | Tidhar | 398/130 |
| 2009/0297156 A1 | 12/2009 | Nakagawa | 398/130 |
| 2009/0297157 A1 | 12/2009 | Nakagawa | 398/130 |
| 2009/0297166 A1 | 12/2009 | Nakagawa et al. | 398/172 |
| 2009/0297167 A1 | 12/2009 | Nakagawa et al. | 398/182 |
| 2009/0310976 A1 | 12/2009 | Nakagawa et al. | 398/183 |
| 2011/0018465 A1* | 1/2011 | Ashdown | 315/294 |
| 2012/0001567 A1* | 1/2012 | Knapp et al. | 315/291 |
| 2012/0281987 A1* | 11/2012 | Schenk et al. | 398/118 |

FOREIGN PATENT DOCUMENTS

| | | | | |
|---|---|---|---|---|
| JP | 2002290335 A | | 10/2002 | H01L 33/00 |
| JP | 2004297425 A | | 10/2004 | H04B 10/10 |
| JP | 2005236667 A | | 9/2005 | H04B 10/10 |
| JP | 2005326792 A | | 11/2005 | G03B 11/04 |
| JP | WO2006033263 | * | 3/2006 | H04B 10/22 |
| JP | 20070081703 | | 3/2007 | H01L 21/336 |
| WO | 0225842 | | 3/2002 | H04B 10/10 |
| WO | 2006033263 | | 3/2006 | H04B 10/10 |

* cited by examiner

DATA TRANSMISSION WITH ROOM ILLUMINATIONS HAVING LIGHT EMITTING DIODES

CROSS-REFERENCE TO RELATED APPLICATIONS

This application is a U.S. National Stage Application of International Application No. PCT/EP2008/061560 filed Sep. 2, 2008, which designates the United States of America, and claims priority to German Application No. 10 2007 043 255.2 filed Sep. 11, 2007, the contents of which are hereby incorporated by reference in their entirety.

TECHNICAL FIELD

The present invention relates to a method for transmitting data by means of a plurality of light emitting diodes and to an arrangement designed for transmitting data, said arrangement having a plurality of light emitting diodes.

BACKGROUND

Light emitting diodes or LEDs are constantly being further developed with regard both to their light output and energy efficiency and their price. It can be foreseen that they will also be put to widespread use for illumination purposes.

In contrast to conventional illumination means such as incandescent light bulbs and fluorescent tubes, light emitting diodes can be modulated very rapidly. They are therefore superbly well suited for data transmission in parallel with illumination.

It is known, to use a light emitting diode for room illumination—that is, as a lamp—simultaneously for transmitting analog and/or digital data by modulating the intensity of the light emitting diode. It is suitable to carry out the modulation in such a way that it is not perceptible to humans, in order not to impair the function of the light emitting diode as a lamp. A simple example of modulation is light-dark modulation at a frequency of several megahertz. More complex modulations known from radio technology can also be used.

For a single light emitting diode, only a small amount of electrical power needs to be switched. But for realistic room illumination, a plurality of light emitting diodes is needed in order to achieve the necessary light level. In large rooms, it can therefore be assumed that several hundred Watts of electrical power are needed. For data transmission, this would have to be switched at high frequencies of several MHz. However, this can only be achieved with a relatively high level of technical and financial expenditure.

SUMMARY

According to various embodiments, a method for transmitting data by means of a plurality of light emitting diodes can be provided, which can be carried out with a simple electronic circuit. According to further embodiments, an arrangement with a plurality of light emitting diodes can be provided that is suitable for transmitting data with a simplified electronic circuit.

According to an embodiment, a method for transmitting data by means of a plurality of light emitting diodes, comprises the steps of: the data is transmitted by means of modulation, particularly visually imperceptible modulation, of the intensity of the light emitting diodes; the light emitting diodes are grouped into at least two groups; the light emitting diodes of each group are modulated together and similarly; and—the modulations of the groups are tuned or matched to one another such that the data associated with the modulations are encoded.

According to a further embodiment, for encoding the data, a number of groups which can be stipulated on the basis of the data can be modulated, particularly modulated dark or modulated light.

According to another embodiment, in a method for room illumination and transmitting data by means of a plurality of light emitting diodes, the light emitting diodes can be operated at a substantially constant intensity for room illumination and furthermore, for transmitting the data, a method as described above can be used.

According to a further embodiment of the above method, the light emitting diodes can be grouped together into groups such that the light emitting diodes of each group are as evenly distributed as possible over the total extent of an illumination body, particularly lamp, formed by the light emitting diodes.

According to yet another embodiment, in a method for transmitting data by means of a plurality of light emitting diodes, the data is transmitted by means of a method as described above and are received by a receiving apparatus, particularly a PC, mobile telephone or PDA.

According to yet another embodiments, in a method for room illumination and transmitting data by means of a plurality of light emitting diodes, the light emitting diodes are operated for room illumination and transmitting the information using the method as described above and the data is received by a receiving apparatus.

According to yet another embodiment, an arrangement for transmitting data comprises a plurality of light emitting diodes, configured such that the data is transmitted by means of modulation, particularly visually imperceptible modulation, of the intensity of the light emitting diodes, wherein the light emitting diodes are grouped together into at least two groups; the light emitting diodes of each group are modulated together and similarly; and the modulations of the groups are matched to one another such that the information associated with the modulations is encoded.

According to yet another embodiment, an arrangement for room illumination and transmitting data may comprise a plurality of light emitting diodes as described above, wherein the light emitting diodes are arranged in one or more lamps, configured such that the light emitting diodes are operated for room illumination at a substantially constant intensity. According to a further embodiment, the light emitting diodes can be grouped into groups such that the light emitting diodes of each group are as evenly distributed as possible over the total extent of the lamp.

According to yet another embodiment, an arrangement for transmitting data may comprise a plurality of light emitting diodes as described above; and a receiving apparatus, particularly a PC, mobile telephone or PDA; configured such that the data transmitted by means of the light emitting diodes can be received by the receiving apparatus.

According to yet another embodiment, an arrangement for room illumination and transmitting data, may comprise an arrangement for transmitting data as described above, which is also configured for room illumination as described above.

BRIEF DESCRIPTION OF THE DRAWINGS

Further advantages and details of the invention will now be described in greater detail based on an exemplary embodiment shown in the drawings, in which.

DETAILED DESCRIPTION

Figure 1:
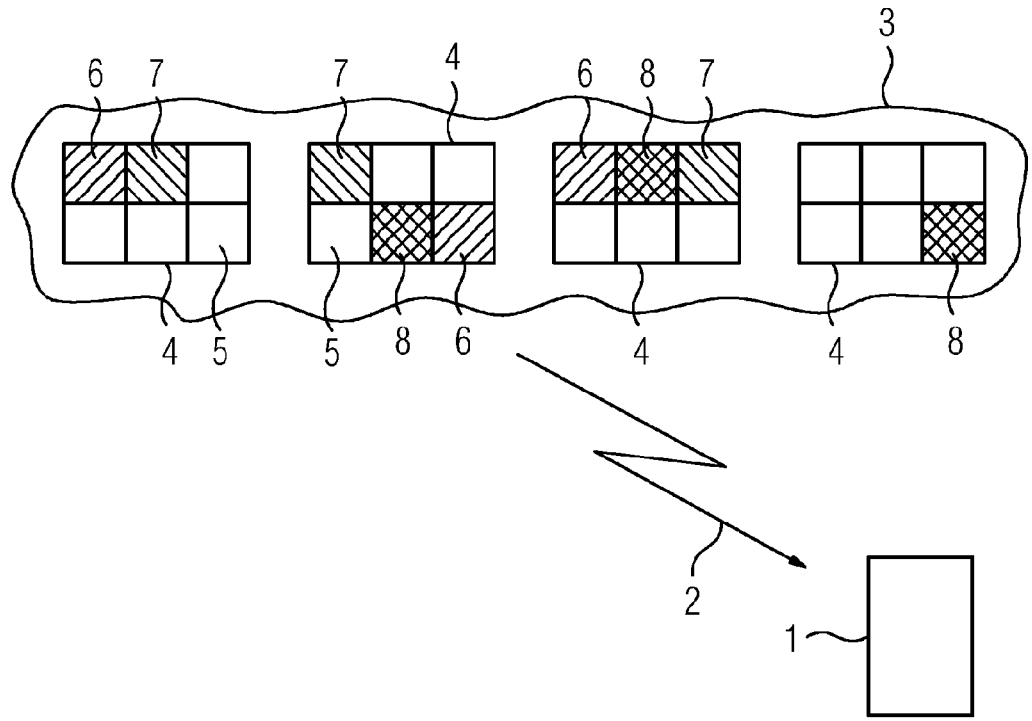
FIG. 1 shows a lamp comprising light emitting diodes and a PDA configured for receiving.

With regard to the method for transmitting data by means of a plurality of light emitting diodes, the data is transmitted by modulating the intensity of the light emitting diodes. The light emitting diodes are also grouped together into at least two groups with regard to the modulation. The light emitting diodes of one group are modulated together and similarly, and the modulations of the groups are tuned or matched to one another such that the information associated with the modulations is encoded.

The modulation is preferably not perceptible to humans since visible modulation is generally annoying. Alternatively, it is also possible to design the modulation to be at least partially perceptible. In this way, it can be indicated to a user directly by way of example that the light emitting diodes are transmitting data. The data is preferably digital data.

The process according to various embodiments makes it possible to carry out multilevel data transmission wherein, by means of the associations of the modulations of the groups, a plurality of bits can be transmitted simultaneously. Compared with similar modulation of all light emitting diodes—i.e. without dividing them into groups—it is possible, at a constant data rate, to reduce the rate of the electrical switching processes. This simplifies the electronic circuitry.

In an embodiment of the method, in order to encode the data, a number of groups stipulated on the basis of the information is switched respectively on and off. For example, transmission of an N bit value, that is an integer value from "0" to "$2^N-1$" ((2 to the power of N) minus 1), the light emitting diodes can be subdivided into $2^N-1$ groups. For this purpose, suitably at least $2^N-1$ light emitting diodes must be present. For a "0", none of the groups is modulated dark, for a "1", one of the groups, and for a "$2^N-1$", all of the groups, i.e. all the light emitting diodes, must be modulated dark.

Transmission of the N bits with only N groups is also conceivable. The dark modulation of a particular number A of groups, where 1<A<N can then be used to transmit different values, the binary representation of which requires the dark modulation of A groups. It should be noted, however, that these values cannot be distinguished solely on the basis of the resulting brightness. The resolution of the values requires an additional effort, for example, position-sensitive detection.

The method for transmitting data can advantageously be used in a method for simultaneous room illumination, wherein the light emitting diodes for room illumination are operated at a substantially constant intensity. The constant intensity is suitably influenced merely by the modulation which is preferably not perceptible to humans.

When used for room illumination, the light-emitting diodes suitably form an illumination body, i.e. a lamp. However, the design freedom is significantly greater for light emitting diodes as compared with conventional illumination means, so that the illumination body could easily extend over a whole room, for example, with individual islands of light emitting diodes, but operated jointly. In a further embodiment and development, the grouping into groups is carried out in such a way that the light emitting diodes of each group are as evenly distributed as possible over the total extent of the illumination body formed by the light emitting diodes. This prevents the possibility that, with uneven modulation of different groups, uneven illumination is produced. Such uneven modulation can arise in the above example with dark modulation if one of the groups is modulated dark for every value greater than "0", whereas another is modulated dark only given a value of "$2^N-1$" for example. The latter group is then modulated dark much less often, leading to a greater overall intensity averaged over time. However, the even distribution over the light emitting bodies prevents this uneven intensity from being perceptible.

The methods described can advantageously be used for transmitting data, wherein the information transmitted is received by a receiving apparatus, particularly a PC, mobile telephone or PDA. For this purpose, the receiving apparatus can employ a suitable receiving device, for example, a photodiode with suitable electronic circuit, as known for the reception of infrared signals.

The arrangement for transmitting data has a plurality of light emitting diodes. These are configured such that the information is transmitted by means of modulation of the intensity of the light emitting diodes. The light emitting diodes are grouped into at least two groups with regard to the modulation, wherein the light emitting diodes of each group can be modulated together and similarly. The modulations of the groups can be matched to one another in such a way that the information is encoded with regard to the modulations. The modulation is preferably not perceptible to humans.

The configurations described in the context of the method are also usable in the arrangement.

FIG. 1 shows schematically as an exemplary embodiment, a lamp 3 conceived for room illumination, comprising four blocks 4 of six light emitting diodes 5 each. The light emitting diodes 5 of one block 4 are arranged here in a rectangle of 2×3 light emitting diodes 5. The blocks 4 are distributed in a room which is to be illuminated, distributed over the length of the ceiling of the room, but operated with a common electronic system.

In this exemplary embodiment, the light emitting diodes 5 are grouped together in eight groups 6 . . . 8 of three light emitting diodes 5 each of which three groups 6 . . . 8 are indicated in FIG. 1. The light emitting diodes 5 of the groups 6 . . . 8 are distributed as evenly as possible among the blocks 4 of the lamp 3 and thus over the ceiling of the room.

It is assumed that the lamp 3 is switched on for room illumination. The light emitting diodes 5 of the lamp 3 therefore radiate with a suitable intensity that is substantially constant. In order to transmit data 2, the intensity of the light emitting diodes 5 is modulated. The four light emitting diodes 5 of each group 6 . . . 8 are modulated together.

Figure 2:
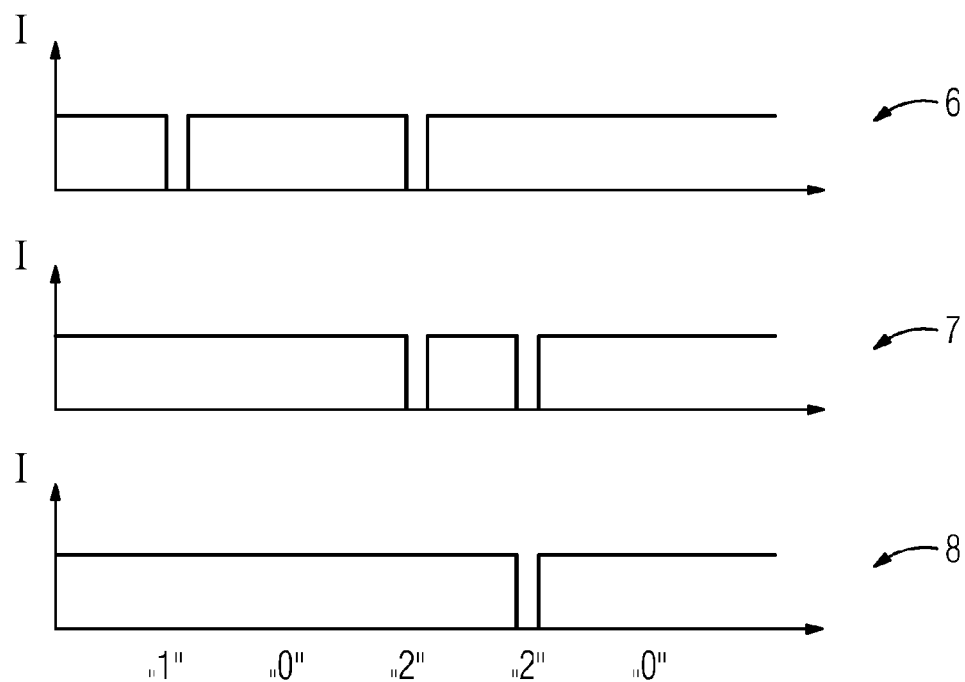
FIG. 2 shows the intensity modulation of a plurality of groups of light emitting diodes.

An exemplary modulation form is shown schematically in FIG. 2 based on the modulation of three of the six groups 6 . . . 8. In order to transmit the data, they are modulated dark in an imperceptible manner for a short time, for example 1 ms. Following a dark modulation, a space of, for example, 19 ms is left before the next possible dark modulation.

With the three groups 6 . . . 8, which are shown by way of example in FIG. 2, the symbols "0" to "3" can be transmitted, i.e. with each dark modulation, an information quantity of 2 bits. Therefore, for a "0", none of the groups 6 . . . 8 is modulated dark, for a "1", one of the groups 6 . . . 8, for a "2" two of the groups 6 . . . 8 and for a "3" all three groups 6 . . . 8 are modulated dark.

It is also possible to vary the described assignments of the number of groups 6 . . . 8 to the symbols. For example, it can be achieved that dark modulation is required as infrequently as possible in that the most frequent of the symbols is transmitted by dark modulation of none of the groups 6 . . . 8. It is also possible to vary the assignment of symbols and the number of groups 6 . . . 8 or to select randomly the actual groups 6 . . . 8 that will be dark modulated for a given number of groups 6 . . . 8, in order to achieve even loading of the light emitting diodes 5 with switching processes. A further embodiment consists therein that for each of the values, at least one group 6 . . . 8 is modulated dark in order to enable better synchronization of the receiver, so that the number of groups needed is increased.

Depending on the symbol to be transmitted, the relevant number of groups is modulated dark. For example, according to FIG. 2, in order to transmit a "1", the first group 6 is modulated dark and to transmit a "0", none of the three groups 6 . . . 8 is modulated dark. To transmit a subsequent "2", the first two groups 6, 7 are modulated dark. In order to distribute the dark modulations more evenly among the groups 6 . . . 8, for a further "2", the second and third groups 7, 8 are now modulated dark. For the subsequent "0", again none of the three groups 6 . . . 8 is modulated dark.

With the modulation used in this example, 2 bits can be transmitted in 20 ms, i.e. a data rate of 100 bit/s is achieved.

If all the light emitting diodes 5 are modulated similarly, for each dark modulation, it is always only one bit that is transmitted. Since, according to the example given, two bits are transferred per dark modulation, with a constant data rate, the switching rate can be reduced to half. This simplifies the electronic design. A larger number of groups 6 . . . 8 reduces the necessary switching rate by approximately the binary logarithm of the number of groups 6 . . . 8.

The data transmitted are received, for example, by a PDA 1. For this purpose, the PDA 1 has a photodiode with corresponding lens and electronic circuit, in order to detect the data from the modulation of the room illumination.

If the lamp 3 is switched off, for example, when, during daytime, much stronger light falls into the room through the windows than the lamp 3 could generate, the transmission of the data 2 is not possible without further effort. A procedure for circumventing this situation is still to operate the lamp 3 in the switched off condition, but at a reduced intensity which, in daylight, is not perceptible to humans. However, the transmitted data can still be received by a receiving apparatus. It is even conceivable to increase the data rate, since firstly the electrical power to be switched is lower due to the lower intensity and, secondly, the modulation is not able to interfere with the illumination function, since in this case, the lamp 3 does not serve for illumination at all.

In daylight, it is also possible for the receiver to be saturated by the daylight, which can lead to impairment of the signal quality. Orientation of the receiver toward the lamp 3, for example, can be used to prevent the impairment.

A further possibility for operation with the lamp 3 switched off lies in reversing the method with the lamp 3 switched on, such that the dark modulation is replaced by light modulation. If this is performed at a sufficient distance, the lamp 3 appears virtually dark.

What is claimed is:

1. A method for transmitting data by means of a plurality of light emitting diodes, comprising the steps of:
    grouping the light emitting diodes into plurality of groups;
    assigning a unique subset of the light emitting diode groups to each of a plurality of different n-bit data values;
    transmitting a sequence of n-bit data values by:
        for each n-bit data value:
            identifying the subset of light emitting diode groups assigned to that n-bit data value, and
            transmitting the n-bit data value by a collective modulation, comprising a collective increase or decrease, of an intensity emitted by the light emitting diodes of the identified subset of light emitting diode groups; and
            wherein for each n-bit data value, the collective intensity modulation for transmitting that data value is performed between non-data-transmission periods having longer durations than that of the collective intensity modulation, wherein the light emitting diodes are not modulated during the non-data-transmission periods, and wherein the emitted intensity of the plurality of light emitting diodes during the transmission of each data value is greater than or less than the emitted intensity of the plurality of light emitting diodes during non-data-transmission periods; and
    periodically varying the assignments of the subsets of the light emitting diode groups corresponding to the different n-bit data values.

2. The method according to claim 1, wherein the plurality of light emitting diodes provide a substantially constant intensity for room illumination during the transmission of the data.

3. The method according to claim 2, wherein the light emitting diodes are grouped together into the plurality of groups such that the light emitting diodes of each group are as evenly distributed as possible over the total extent of an illumination body formed by the light emitting diodes.

4. The method according to claim 1, further comprising receiving the transmitted data values by a receiving apparatus.

5. The method according to claim 4, wherein the receiving apparatus is a PC, a mobile telephone or a PDA.

6. The method according to claim 1, wherein the light emitting diodes are operated both for room illumination and for transmitting the data values to the receiving apparatus.

7. The method according to claim 1, wherein each light emitting diode of a group is modulated by the sane modulation.

8. The method according to claim 1, wherein the determined subset of light emitting diode groups for transmitting each n-bit data value includes a number of light emitting diode groups equal to that n-bit data value.

9. The method according to claim 1, wherein a particular subset of light emitting diode groups includes all of the plurality of groups.

10. The method according to claim 1, further comprising transmitting a data value of zero by modulating none of the light emitting diode groups during a particular time period.

11. The method according to claim 1, wherein determining the subset of light emitting diode groups for transmitting the n-bit data value comprises identifying a subset of light emitting diode groups having a predefined correspondence with that n-bit data value.

12. The method according to claim 1, wherein determining the subset of light emitting diode groups for transmitting the n-bit data value comprises identifying a subset of light emitting diode groups corresponding with that n-bit data value, wherein the subset of light emitting diode groups corresponding with the n-bit data value varies over time.

13. The method according to claim 1, wherein determining a subset of light emitting diode groups for transmitting the n-bit data value comprises selecting a subset of light emitting diode groups for transmitting the n-bit data value, wherein the number of groups in the subset is equal to the n-bit data value.

14. The method according to claim 1, the assignments of the subsets of the light emitting diode groups corresponding to the different n-bit data values are periodically varied in a random manner.

15. An arrangement for transmitting data comprising:
    a plurality of light emitting diodes,
    wherein the light emitting diodes are grouped together into a plurality of light emitting diode groups;
    electronic circuitry configured to transmit a sequence of n-bit data values by:

for each n-bit data value:
   determining a subset of light emitting diode groups for transmitting that n-bit data value, and
   transmitting the n-bit data value by a collective modulation, comprising a collective increase or decrease, of an intensity emitted by the light emitting diodes of the determined subset of light emitting diode groups;
      wherein for each n-bit data value, the collective intensity modulation for transmitting that data value is performed between non-data-transmission periods having longer durations than that of the collective intensity modulation, wherein the light emitting diodes are not modulated during the non-data-transmission periods, and wherein the emitted intensity of the plurality of light emitting diodes during the transmission of each data value is greater than or less than the emitted intensity of the plurality of light emitting diodes during non-data-transmission periods; and
      wherein the sequence of n-bit data values is transmitted independent of the respective color or wavelength emitted by the individual light emitting diodes.

16. The arrangement according to claim 15, wherein the light emitting diodes are arranged in one or more lamps, configured such that the light emitting diodes are operated for room illumination at a substantially constant intensity.

17. The arrangement according to claim 16, wherein the light emitting diodes are grouped into the plurality of light emitting diode groups such that the light emitting diodes of each group are as evenly distributed as possible over the total extent of the lamp.

18. The arrangement according to claim 15, further comprising:
   a receiving apparatus configured to receive the data transmitted by the light emitting diodes.

19. The arrangement according to claim 18, wherein the light emitting diodes are arranged in one or more lamps, configured such that the light emitting diodes are operated for room illumination at a substantially constant intensity.

20. The arrangement according to claim 18, wherein the receiving apparatus is a PC, a mobile telephone or a PDA.

21. The arrangement according to claim 15, wherein each light emitting diode of a group is modulated by the same modulation.

22. A method for transmitting data by means of a collection of light emitting diodes, comprising the steps of:
   grouping the light emitting diodes of the collection into a plurality of groups;
   for each of a plurality of different n-bit data values, assigning a unique quantity of the light emitting diode groups to illuminate simultaneously to transmit that n-bit data value, such that the transmission of each different n-bit data value provides a different total level of illumination provided by the collection of the light emitting diodes;
   transmitting a sequence of n-bit data values by:
      for each respective n-bit data value:
         identifying the unique quantity of light emitting diode groups assigned to the respective n-bit data value; and
         transmitting the n-bit data value by collectively illuminating the identified quantity of light emitting diodes assigned to the respective n-bit data value, such that a total level of illumination provided by the collection of light emitting diodes is detectable by a receiver as corresponding to the respective n-bit data value; and
      wherein for each n-bit data value, the collective illumination for transmitting that data value is performed between non-data-transmission periods having longer durations than that of the collective illumination, wherein the light emitting diodes are not modulated during the non-data-transmission periods, and wherein the emitted intensity during the transmission of each data value is greater than or less than the emitted intensity during non-data-transmission periods.

* * * * *